US012618715B2

(12) United States Patent
Yao et al.

(10) Patent No.: US 12,618,715 B2
(45) Date of Patent: May 5, 2026

(54) SENSING DEVICE

(71) Applicant: InnoLux Corporation, Miao-Li County (TW)

(72) Inventors: I-An Yao, Miao-Li County (TW); Yu-Tsung Liu, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 188 days.

(21) Appl. No.: 18/619,784

(22) Filed: Mar. 28, 2024

(65) Prior Publication Data

US 2024/0361183 A1     Oct. 31, 2024

(30) Foreign Application Priority Data

Apr. 28, 2023     (CN) ......................... 202310477326.2

(51) Int. Cl.
*G01J 5/0806*          (2022.01)
(52) U.S. Cl.
CPC .................................. *G01J 5/0806* (2013.01)
(58) Field of Classification Search
CPC .... G01J 5/0806; G01J 5/08; G01J 5/20; G01J 5/045; G01J 5/064
See application file for complete search history.

(56) References Cited

U.S. PATENT DOCUMENTS

| | | | |
|---|---|---|---|
| 11,054,311 B1 * | 7/2021 | Oulachgar | .............. G01J 5/024 |
| 2014/0267756 A1 | 9/2014 | Gousev et al. | |
| 2020/0232853 A1 | 7/2020 | Nam et al. | |
| 2023/0111183 A1 | 4/2023 | Lee et al. | |

* cited by examiner

Primary Examiner — Uzma Alam
Assistant Examiner — Fani Polyzos Boosalis
(74) Attorney, Agent, or Firm — MUNCY, GEISSLER, OLDS & LOWE, P.C.

(57) ABSTRACT

A sensing device includes: a first substrate; a plurality of sensing units disposed on the first substrate, wherein the plurality of sensing units are used for sensing light with wavelengths within a wavelength range; and a second substrate disposed opposite to the first substrate and assembled to the first substrate, wherein the second substrate has an overlapping area overlapping with the plurality of sensing units in a normal direction of the first substrate, wherein the second substrate has an optical lens in the overlapping area, the optical lens includes a plurality of micro-structures, and a pitch between the plurality of micro-structures is less than or equal to a maximum wavelength value of the wavelength range.

19 Claims, 6 Drawing Sheets

SENSING DEVICE

CROSS-REFERENCE TO RELATED APPLICATIONS

This application claims the benefits of the Chinese Patent Application Serial Number 202310477326.2, filed on Apr. 28, 2023, the subject matter of which is incorporated herein by reference.

BACKGROUND

Field

The present disclosure relates to a sensing device and, more particularly to a sensing device with an optical lens.

Description of Related Art

Infrared sensors can detect infrared rays that are invisible to the naked eye. They have the advantages of detection without contact with objects, high sensitivity, and high anti-noise characteristics. They can be used in object distance sensing, temperature detection, human body detection, etc., and has high application value.

However, the infrared sensing array is easily affected by the external environment, causing the sensing signal to be affected. In addition, an additional optical lens is required, resulting in complex manufacturing steps and high cost.

Therefore, it is desirable to provide a sensing device to improve the conventional defects.

SUMMARY

The present disclosure provides a sensing device, comprising: a first substrate; a plurality of sensing units disposed on the first substrate, wherein the plurality of sensing units are used for sensing light with wavelengths within a wavelength range; and a second substrate disposed opposite to the first substrate and assembled to the first substrate, wherein the second substrate has an overlapping area overlapping with the plurality of sensing units in a normal direction of the first substrate, wherein the second substrate has an optical lens in the overlapping area, the optical lens comprises a plurality of micro-structures, and a pitch between the plurality of micro-structures is less than or equal to a maximum wavelength value of the wavelength range.

Other novel features of the disclosure will become more apparent from the following detailed description when taken in conjunction with the accompanying drawings.

DETAILED DESCRIPTION

Figure 1:
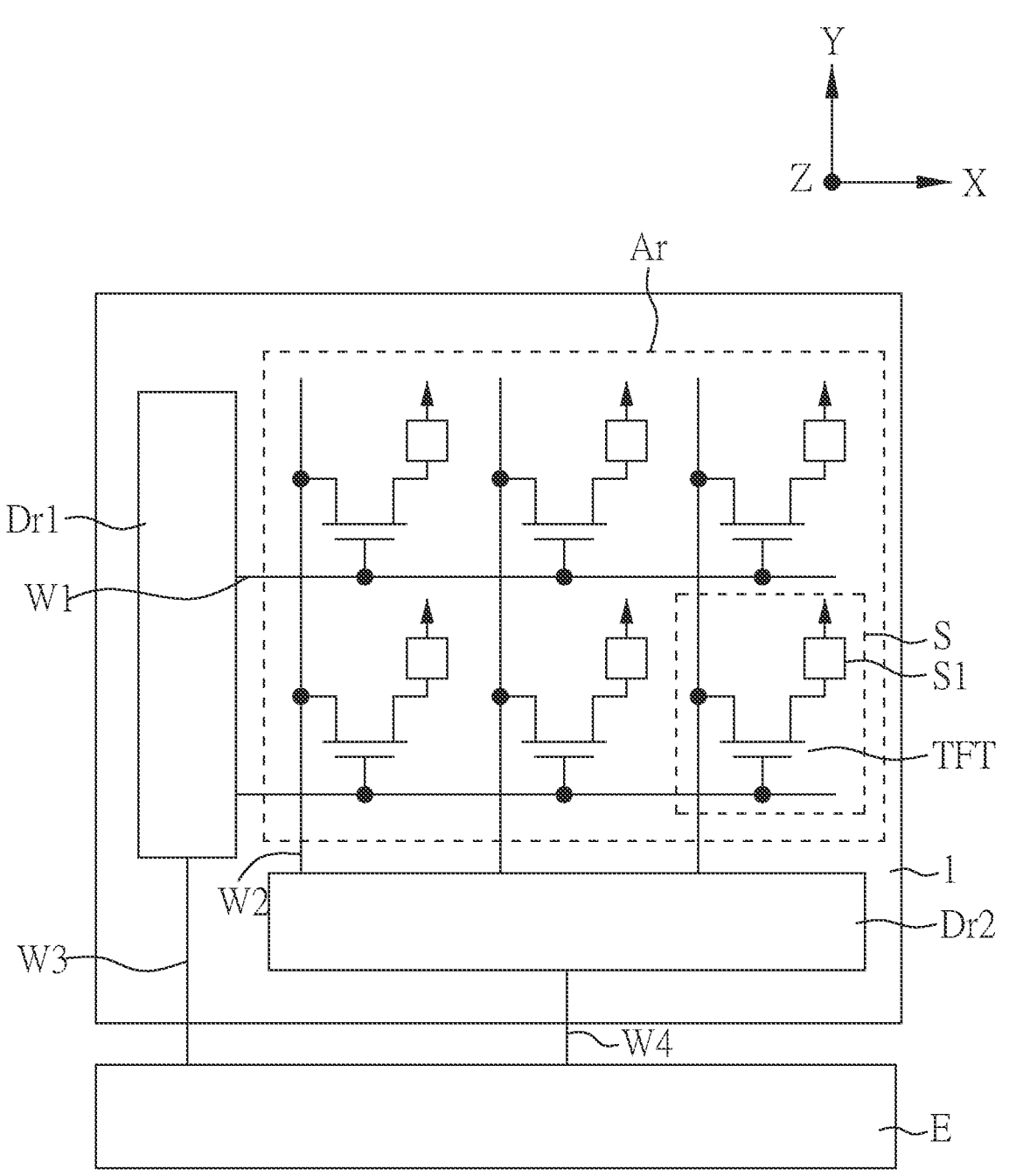
FIG. 1 is a schematic top view of part of a sensing device according to one embodiment of the present disclosure.

The following is specific embodiments to illustrate the implementation of the present disclosure. Those who are familiar with this technique can easily understand the other advantages and effects of the present disclosure from the content disclosed in the present specification. The present disclosure can also be implemented or applied by other different specific embodiments, and various details in the present specification can also be modified and changed according to different viewpoints and applications without departing from the spirit of the present disclosure.

It should be noted that, in the present specification, when a component is described to have an element, it means that the component may have one or more of the elements, and it does not mean that the component has only one of the element, except otherwise specified. Furthermore, the ordinals recited in the specification and the claims such as "first", "second" and so on are intended only to describe the elements claimed and imply or represent neither that the claimed elements have any proceeding ordinals, nor that sequence between one claimed element and another claimed element or between steps of a manufacturing method. The use of these ordinals is merely to differentiate one claimed element having a certain designation from another claimed element having the same designation.

In the specification and the appended claims of the present disclosure, certain words are used to refer to specific elements. Those skilled in the art should understand that electronic device manufacturers may refer to the same components by different names. The present specification does not intend to distinguish between elements that have the same function but have different names. In the following description and claims, words such as "comprising", "including", "containing", and "having" are open-ended words, so they should be interpreted as meaning "containing but not limited to . . . ". Therefore, when the terms "comprising", "including", "containing" and/or "having" are used in the description of the present disclosure, they specify the existence of corresponding features, regions, steps, operations and/or components, but do not exclude the existence of one or more corresponding features, regions, steps, operations and/or components.

The terms, such as "about", "equal to", "equal" or "same", "substantially", or "approximately", are generally interpreted as within 10%, 5%, 3%, 2%, 1%, or 0.5% of a given value or range. The quantity given here is an approximate quantity, that is, without specifying "about", "approximately", "substantially" and "approximately", "about", "approximately", "substantially" and "approximately" can still be implied. Furthermore, when a value is "in a range from a first value to a second value" or "in a range between a first value and a second value", the value can be the first value, the second value, or another value between the first value and the second value.

In the present specification, except otherwise specified, the terms (including technical and scientific terms) used herein have the meanings generally known by a person skilled in the art. It should be noted that, except otherwise specified, in the embodiments of the present disclosure, these terms (for example, the terms defined in the generally used dictionary) should have the meanings identical to those known in the art, the background of the present disclosure or the context of the present specification, and should not be read by an ideal or over-formal way.

In addition, relative terms such as "below" or "under" and "on", "above" or "over" may be used in the embodiments to describe the relative relationship between one element and another element in the drawings. It will be understood that if the device in the drawing was turned upside down, elements described on the "lower" side would then become elements described on the "upper" side. When a unit (for example, a layer or a region) is referred to as being "on" another unit, it can be directly on the another unit or there may be other units therebetween. Furthermore, when a unit is said to be "directly on another unit", there is no unit therebetween. Moreover, when a unit is said to be "on another unit", the two have a top-down relationship in a top view, and the unit can be disposed above or below the another unit, and the top-bottom relationship depends on the orientation of the device.

In the present disclosure, the distance, the length, the width, the height and the thickness may be measured by using an optical microscope or by a cross-sectional image in an electron microscope, but the present disclosure is not limited thereto. Furthermore, any two values or directions used for comparison may have certain errors. If the first value is equal to the second value, it implies that there may be an error of about 10% between the first value and the second value. If the first direction is perpendicular to the second direction, the angle between the first direction and the second direction may be between 80° and 100°. If the first direction is parallel to the second direction, the angle between the first direction and the second direction may be between 0° and 10°.

It should be noted that the technical solutions provided by different embodiments hereinafter may be replaced, combined or used in combination, so as to constitute another embodiment without violating the spirit of the present disclosure.

FIG. 1 is a schematic top view of part of a sensing device according to one embodiment of the present disclosure.

In one embodiment of the present disclosure, as shown in FIG. 1, the sensing device may comprise: a first substrate 1; a sensing array Ar disposed on the first substrate 1, wherein the sensing array Ar comprises a plurality of sensing units S used for sensing light with wavelengths within a wavelength range; and drivers Dr1, Dr2 disposed on the first substrate 1, wherein the drivers Dr1, Dr2 are electrically connected to each sensing unit S in the sensing array Ar respectively.

More specifically, as shown in FIG. 1, each sensing unit S may comprise: a sensor S1 used for sensing light with wavelengths within a wavelength range; and a transistor TFT electrically connected to the sensor S1. The drivers Dr1, Dr2 may be electrically connected to the transistor TFT in each sensing unit S through the first conductive line W1 and the second conductive line W2 respectively to transmit or receive signals to achieve the purpose of sensing. For example, the driver Dr1 may transmit control signals through the first conductive lines W1 to control the sensing unit S; or the driver Dr2 may receive sensing signals generated by the sensing units S through the second conductive lines W2. Thus, in the present disclosure, the first substrate 1 and the units formed thereon may form a sensing array substrate.

In the present disclosure, as shown in FIG. 1, the sensing device may further comprise an electronic component E, which is electrically connected to the drivers Dr1 and Dr2 respectively. More specifically, the electronic component E may be electrically connected to the driver Dr1 through the conductive line W3, and may be electrically connected to the driver Dr2 through the conductive line W4. The electronic component E may be used, for example, to control or process signals transmitted to the driver Dr1 or to receive signals from the driver Dr2. In one embodiment of the present disclosure, the electronic component E may be an integrated circuit (IC), but the present disclosure is not limited thereto. In addition, although one driver Dr1 and one driver Dr2 are used as an example in FIG. 1, in other embodiments of the present disclosure, the sensing device may comprise a plurality of drivers Dr1 and/or a plurality of drivers Dr2, which may be electrically connected to the electronic components E through a plurality of conductive lines W3 and/or a plurality of conductive lines W4 respectively.

Figure 2:
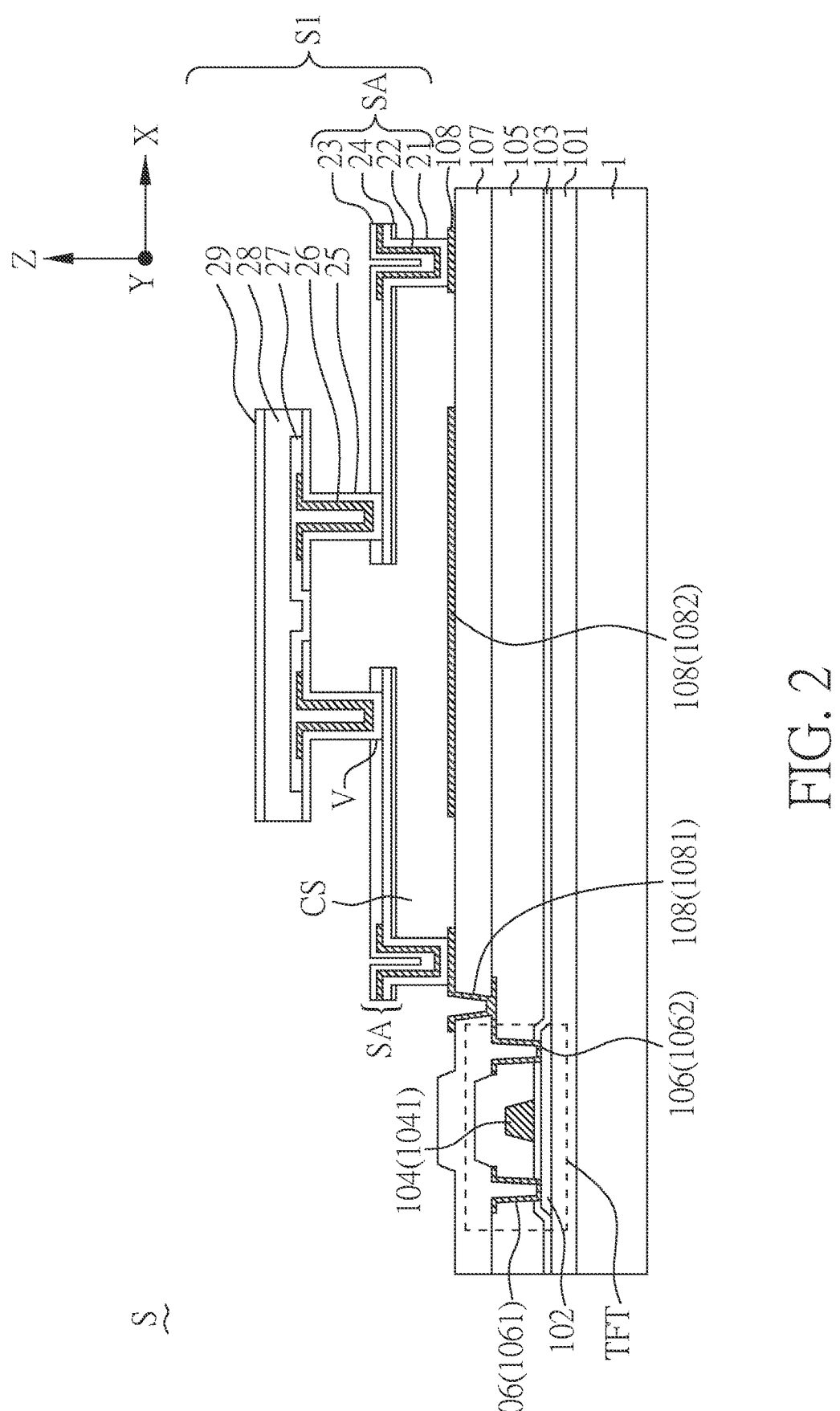
FIG. 2 is a schematic cross-sectional view of a sensing unit according to one embodiment of the present disclosure.

FIG. 2 is a schematic cross-sectional view of a sensing unit according to one embodiment of the present disclosure.

In one embodiment of the present disclosure, as shown in FIG. 2, the sensing unit S may comprise: a first substrate 1; a buffer layer 101 disposed on the first substrate 1; an active layer 102 disposed on the buffer layer 101; a first insulating layer 103 disposed on the active layer 102; a first metal layer 104 disposed on the first insulating layer 103 and comprising a gate electrode 1041; a second insulating layer 105 disposed on the first metal layer 104; a second metal layer 106 disposed on the second insulating layer 105 and comprising a source electrode 1061 and a drain electrode 1062, wherein the active layer 102, the first insulating layer 103, the gate electrode 1041, the second insulating layer 105, the source electrode 1061 and the drain electrode 1062 forms a transistor TFT; a third insulating layer 107 disposed on the second metal layer 106; a third metal layer 108 disposed on the third insulating layer 107; and a sensor S1 disposed on the first substrate 1. Herein, the sensor S1 may comprise: a supporting layer 21 disposed on the third metal layer 108 and electrically connected to the third metal layer 108; a fourth metal layer 22 disposed on the supporting layer 21; a first passivation layer 23 disposed on the fourth metal layer 22, wherein the first passivation layer 23 comprises a plurality of vias V to expose the supporting layer 21; a second passivation layer 24, wherein the supporting layer 21 is disposed between the first passivation layer 23 and the second passivation layer 24; an absorbing layer 25 disposed on the first passivation layer 23 and electrically connecting to the supporting layer 21 through the vias V of the first passivation layer 23; a fifth metal layer 26 disposed on the absorbing layer 25; a third passivation layer 27 disposed on the fifth metal layer 26; a sensing layer 28 disposed on the third passivation layer 27; and a fourth passivation layer 29 disposed on the sensing layer 28. In the present disclosure, the absorbing layer 25 can absorb light having wavelengths within a specific wavelength range to generate heat, and the heat is transferred to the sensing layer 28 through the fifth metal layer 26 and the third passivation layer 27. The resistance of the sensing layer 28 is changed with thermal changes to form an electrical signal, thereby allowing the sensor S1 to sense light having wavelengths within a specific wavelength range.

In the present disclosure, as shown in FIG. 2, the supporting layer 21, the fourth metal layer 22, the first passivation layer 23 and the second passivation layer 24 may form two adjacent supporting arms SA to support the absorbing layer 25 and other components above. There is cavity structure CS between the third metal layer 108 and the two adjacent supporting arms SA and the absorbing layer 25. The cavity structure CS may be formed by respectively disposing a sacrificial layer on the third metal layer 108 and the supporting arms SA, and then removing the sacrificial layer. The cavity structure CS may be used to prevent heat loss. In addition, the third metal layer 108 may comprise a sub-metal layer 1081 and a sub-metal layer 1082, and the sub-metal layer 1081 may be electrically connected to the transistor TFT for transmitting or receiving signals. The sub-metal layer 1082 may be disposed in the cavity structure CS and may be used as a reflective layer to reflect light to the absorbing layer 25, thereby improving light utilization.

In the present disclosure, the first substrate 1 may be a rigid substrate or a flexible substrate. The material of the first substrate 1 may comprise quartz, glass, wafer, sapphire, resin, epoxy resin, polycarbonate (PC), polyimide (PI), polypropylene (PP), polyethylene terephthalate (PET), polymethylmethacrylate (PMMA), other plastic materials or a combination thereof, but the present disclosure is not limited thereto. In the present disclosure, the materials of the buffer layer 101, the first insulating layer 103, the second insulating layer 105 and the third insulating layer 107 may be the same or different, wherein the materials of the buffer layer 101, the first insulating layer 103, the second insulating layer 105 and the third insulating layer 107 may respectively comprise silicon nitride, silicon oxide, silicon oxynitride, silicon carbonitride or a combination thereof, but the present disclosure is not limited thereto. In the present disclosure, the material of the active layer 102 may comprise amorphous silicon, polycrystalline silicon (for example, low temperature polycrystalline silicon (LTPS)), or oxide semiconductor (for example, indium gallium zinc oxide (IGZO)), but the present disclosure is not limited thereto. In the present disclosure, the materials of the first metal layer 104, the second metal layer 106 and the third metal layer 108 may be the same or different, wherein the materials of the first metal layer 104, the second metal layer 106 and the third metal layer 108 may respectively comprise gold, silver, copper, palladium, platinum (Pt), ruthenium (Ru), aluminum, cobalt, nickel, titanium, molybdenum (Mo), manganese, zinc, an alloy thereof or a combination thereof, but the present disclosure is not limited thereto.

In addition, in the present disclosure, the material of the supporting layer 21 may comprise titanium nitride (TiN), titanium aluminide (TiAl), titanium aluminium nitride (TiAlN), titanium aluminum oxide (TiAlO), titanium silicon aluminum (TiSiAl), titanium tungsten (TiW), titanium tungsten nitride (TiWN), aluminum nitride (AlNx) or a combination thereof, but the present disclosure is not limited thereto. In the present disclosure, the materials of the fourth metal layer 22 and the fifth metal layer 26 may be the same or different, wherein the materials of the fourth metal layer 22 and the fifth metal layer 26 may respectively comprise molybdenum (Mo), molybdenum nitride (MoN), molybdenum tungsten (MoW), tungsten (W) or a combination thereof, but the present disclosure is not limited thereto. In the present disclosure, the materials of the first passivation layer 23, the second passivation layer 24, the third passivation layer 27 and the fourth passivation layer 29 may be the same or different, wherein the materials of the first passivation layer 23, the second passivation layer 24, the third passivation layer 27 and the fourth passivation layer 29 may respectively comprise silicon oxide, silicon oxynitride, silicon nitride, aluminum oxide, resin, polymer, photoresist material or a combination thereof, but the present disclosure is not limited thereto. In the present disclosure, the material of the absorbing layer 25 may comprise titanium, titanium nitride (TiN), platinum, gold, nickel, niobium (Nb), an alloy thereof or a combination thereof, but the present disclosure is not limited thereto. In the present disclosure, the material of the sensing layer 28 may comprise amorphous silicon, vanadium oxide (VOx), yttrium barium copper oxide (YBaCuO), silicon germanium oxide (GeSiO), silicon-germanium (SiGe), bismuth lanthanum strontium manganese oxide (BiLaSrMnO) or a combination thereof, but the present disclosure is not limited thereto.

Figures 3A, 3B, 3C:
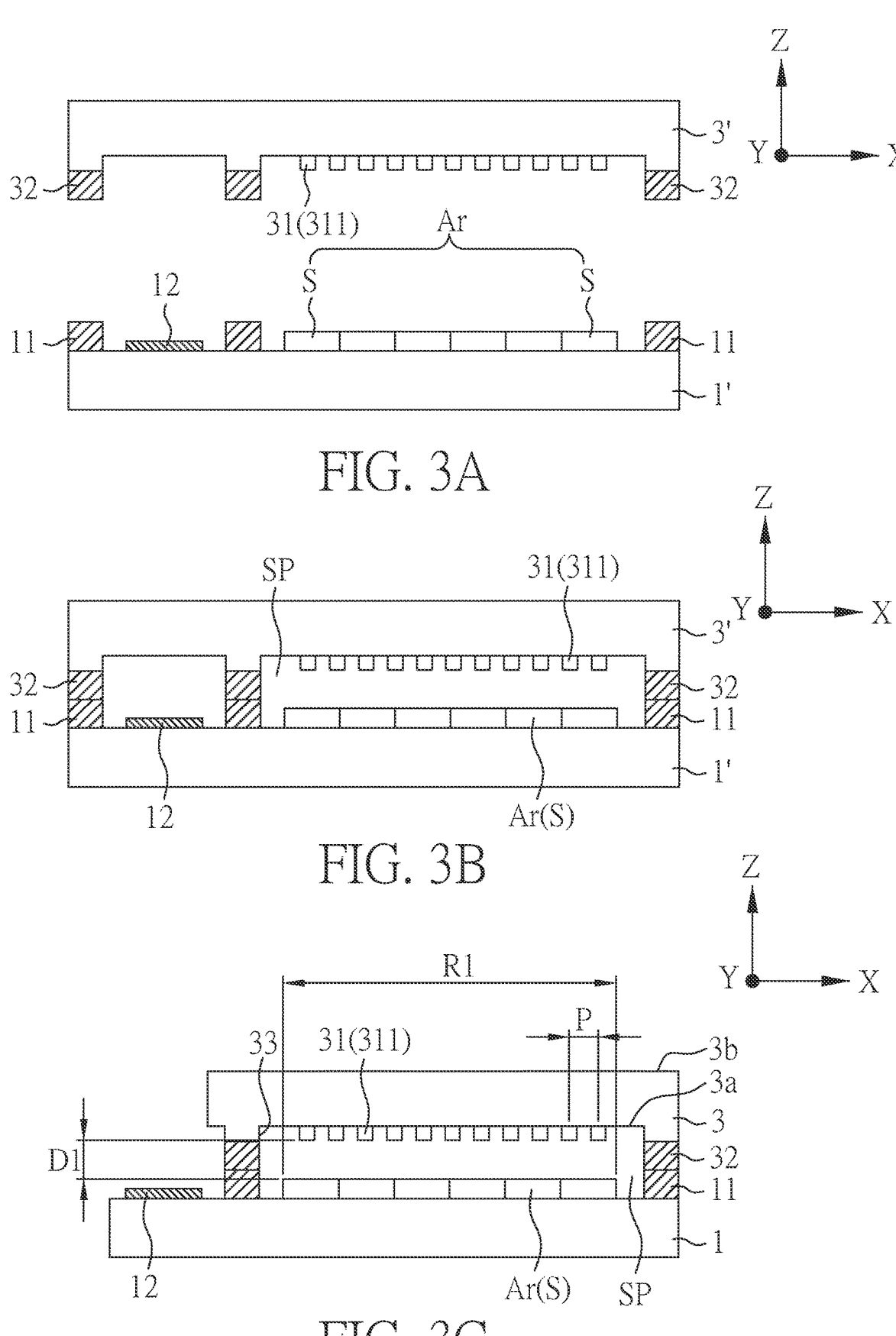
FIG. 3A to FIG. 3C are schematic cross-sectional views showing a method for manufacturing a sensing device according to one embodiment of the present disclosure.

FIG. 3A to FIG. 3C are schematic cross-sectional views showing a method for manufacturing a sensing device according to one embodiment of the present disclosure. Although not shown in the cross-sectional views of FIG. 3A to FIG. 3C, the pads are electrically connected to the sensing array in other cross-sections.

In one embodiment of the present disclosure, first, as shown in FIG. 3A, a lower substrate 1' and an upper substrate 3' are respectively provided. Herein, the lower substrate 1' may be provided with: the sensing array Ar as shown in FIG. 1; a plurality of first bonding units 11, wherein the sensing array Ar is disposed between two adjacent first bonding units 11; and a pad 12 disposed adjacent to the sensing array Ar and electrically connected to the sensing array Ar. The upper substrate 3' may be provided with: an optical lens 31 which may comprise a plurality of micro-structures 311; and a plurality of second bonding units 32, wherein the optical lens 31 is disposed between two adjacent second bonding units 32.

In the present disclosure, the material of lower substrate 1' may be referred to the material of first substrate 1, and is not described again here. In the present disclosure, the material of the upper substrate 3' may comprise sapphire, polyethylene (PE), silicon, germanium (Ge), chalcogenide glass, gallium arsenide (GaAs), magnesium fluoride (MgF$_2$), calcium fluoride (CaF$_2$), barium fluoride (BaF$_2$), zinc sulfide (ZnS), zinc selenide (ZnSe), aluminum oxide (Al$_2$O$_3$) or a combination thereof, but the present disclosure is not limited thereto. In the present disclosure, the materials of the first bonding units 11 and the second bonding units 32 may be the same or different, and the materials of the first bonding units 11 and the second bonding units 32 may respectively comprise a metal, an alloy thereof, frit paste or a combination thereof. The metal may comprise, for example, gold, silver, copper, aluminum, chromium, platinum, titanium, nickel, tin, tungsten, palladium or a combination thereof, but the present disclosure is not limited thereto. In the present disclosure, the material of the pad 12 may comprise a metal, a metal oxide, an alloy thereof or a combination thereof. For example, the material of the pad 12 may comprise gold, silver, copper, aluminum, chromium, platinum, indium zinc oxide (IZO), indium tin oxide (ITO), indium tin zinc oxide (ITZO), indium gallium zinc oxide (IGZO), aluminum zinc oxide (AZO) or a combination thereof, but the present disclosure is not limited thereto. In the present disclosure, the material of the optical lens 31 may comprise silicon, germanium (Ge), chalcogenide glass, gallium arsenide (GaAs), zinc sulfide (ZnS), zinc selenide (ZnSe) or a combination thereof, but the present disclosure is not limited thereto. In addition, in one embodiment of the present disclosure, the reflective index of the optical lens 31 may be greater than 2.0.

In the present disclosure, when the material of the optical lens 31 and the material of the upper substrate 3' are the same, the upper substrate 3' may be patterned through a lithography process to form the optical lens 31 on the upper substrate 3'. Alternatively, when the material of the optical lens 31 and the material of the upper substrate 3' are same or different, the material of the optical lens 31 may be first deposited on the upper substrate 3', followed by patterning through a lithography process to form the optical lens 31 on the upper substrate 3'. By combining the optical lens 31 and the upper substrate 3' or integrating the optical lens 31 and the upper substrate 3', no additional optical lenses are required, which can simplify the manufacturing process or save costs.

Next, as shown in FIG. 3B, the lower substrate 1' and the upper substrate 3' are assembled through a bonding process. More specifically, by performing the bonding process on the first bonding units 11 of the lower substrate 1' and the second bonding units 32 of the upper substrate 3', the upper substrate 3' and the lower substrate 1' are assembled to form a sealed space SP, wherein the sensing units S and the optical lens 31 are overlapped in the normal direction Z of the sensing device. In the present disclosure, the bonding process may include thermo-compression bonding, eutectic bonding, laser welding, other suitable processes or a combination thereof.

Then, the lower substrate 1' and the upper substrate 3' are cut into appropriate sizes to form the sensing device. Hence, as shown in FIG. 3C, the sensing device may comprise: a first substrate 1; a plurality of sensing units S disposed on the first substrate 1 and used for sensing light with wavelengths within a wavelength range; and a second substrate 3 disposed opposite to the first substrate 1 and assembled to the first substrate 1, wherein the second substrate 3 has an overlapping area R1 overlapping with the sensing units S in a normal direction Z of the first substrate 1, wherein the second substrate 3 has an optical lens 31 in the overlapping area R1, the optical lens 31 comprises a plurality of micro-structures 311, and a pitch P between the micro-structures 311 is less than or equal to a maximum wavelength value of the wavelength range.

In this disclosure, the material of the first substrate 1 is as described above, the material of the second substrate 3 may be referred to the material of the upper substrate 3', the sensing units S are as shown in FIG. 1, the material of the optical lens 31 is as described above, and these are not described again. In the present disclosure, the sensing units S may sense light in the infrared wavelength range. For example, the sensing units S may sense light in the wavelength range between 8 μm and 20 μm. The optical lens 31 may converge or diverge light and may be used to improve the sensing effect of the sensing units S.

As shown in FIG. 3C, in one embodiment of the present disclosure, the second substrate 3 has a recess 33, and the optical lens 31 may be disposed in the recess 33. In one embodiment of the present disclosure, a distance D1 between the optical lens 31 and the sensing units S is between 150 μm to 250 μm in the normal direction Z of the first substrate 1. In the present disclosure, the distance D1 is defined as the distance between the surface of the optical lens 31 and the surface of the passivation layer 29 of the sensing unit S (for example, the fourth passivation layer 29 of the sensor S1 in FIG. 2). In one embodiment of the present disclosure, the second substrate 3 may comprise a first surface 3a and a second surface 3b opposite to the first surface 3a, wherein the first surface 3a is closer to the first substrate 1 than the second surface 3b, and the optical lens 31 may be disposed on the first surface 3a of the second substrate 3.

In the present disclosure, as shown in FIG. 3C, the sensing device may further comprise: first bonding units 11 disposed on the first substrate 1, wherein the sensing units S are disposed between the first bonding units 11; and second bonding units 32 disposed on the second substrate 3, wherein the optical lens 31 is disposed between the second bonding units 32. The first substrate 1 and the second substrate 3 may be assembled through the first bonding units 11 and the second bonding units 32 to form a sealed space SP. The sealed space SP may be a vacuum or close to a vacuum, which can reduce the interference of other external environment factors (such as moisture, air, etc.) on the sensing signals. In addition, the sensing device may further comprise a pad 12 disposed on the first substrate 1, wherein the pad 12 is disposed adjacent to the sensing array Ar and is electrically connected to the sensing array Ar. The sensing array Ar may be electrically connected to external components (such as the drivers Dr1, Dr2 or the electronic component E shown in FIG. 1) through the pad 12 to transmit or receive signals.

Figure 4:
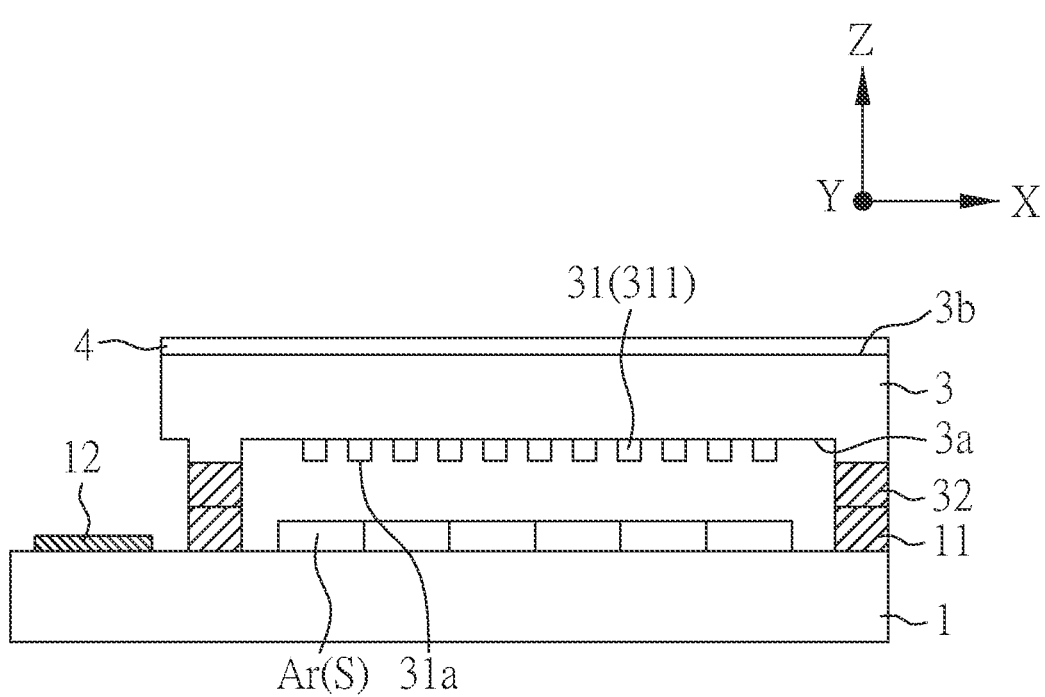
FIG. 4 is a schematic view of a sensing device according to one embodiment of the present disclosure.

FIG. 4 is a schematic view of a sensing device according to one embodiment of the present disclosure. The sensing device in FIG. 4 is similar to that shown in FIG. 3C, except for the following differences.

In one embodiment of the present disclosure, as shown in FIG. 4, the sensing device may further comprise an optical film 4 disposed on the second substrate 3. More specifically, the optical film 4 may be disposed on a side of the second substrate 3 away from the optical lens 31. For example, the optical film 4 may be disposed on the second surface 3b of the second substrate 3, but the present disclosure is not limited thereto. In other embodiments of the present disclosure, even not shown in the figure, the optical film 4 may be disposed on the optical lens 31. For example, the optical film 4 may be disposed on the first surface 3a of the second substrate 3 and the surface 31a of the optical lens 31. In other embodiments of the present disclosure, even not shown in the figure, the optical film 4 may be disposed on the first surface 3a and the second surface 3b of the second substrate 3. The optical film 4 may be used to reduce the reflection of incident light and/or block light in unwanted wavelength ranges to increase the transmittance of light in a specified wavelength range, thereby improving the sensing effect. In the present disclosure, the specified wavelength range may be, for example, between 8 μm and 20 μm or between 8 μm and 14 μm, but the present disclosure is not limited thereto. In one embodiment of the present disclosure, the optical film 4 may be a Bragg reflector, but the present disclosure is not limited thereto.

In the present disclosure, the material of the optical film 4 may comprise germanium (Ge), zinc sulfide (ZnS), zinc selenide (ZnSe), magnesium fluoride ($MgF_2$), beryllium fluoride ($BeF_2$), potassium chloride, trisulfide Arsenic ($As_2S_3$) or a combination thereof, but the present disclosure is not limited thereto. In the present disclosure, the thickness of the optical film 4 may be between 0.01 μm and 5 μm, for example, may be between 0.01 μm to 3 μm, 0.03 μm to 3 μm or 0.05 μm to 2 μm, but the present disclosure is not limited thereto. In the present disclosure, the optical film 4 may have a single-layer or multi-layer structure, and the materials of each layer may be the same or different. When the optical film 4 has a single-layer structure, the material of the optical film 4 is different from the material of the second substrate 3. When the optical film 4 has a multi-layer structure, for example, the optical film 4 has a first sub-optical film and a second sub-optical film, the first sub-optical film is closer to the second substrate 3 compared to the second sub-optical film and the first sub-optical film is in contact with the second substrate 3 and/or the optical lens 31, wherein the material of the first sub-optical film is different from the material of the second substrate 3 and/or the optical lens 31. In one embodiment of the present disclosure, the second substrate 3 and/or the optical lens 31 has a refractive index n1, the first sub-optical film has a refractive index n2, and the second sub-optical film has a refractive index n3, wherein the refractive index n2 may be greater than the refractive index n1, and the refractive index n1 may be greater than the refractive index n3. In other words, the refractive index n2 is greater than the refractive index n1, and the refractive index n1 is greater than the refractive index n3 (that is, n2>n1>n3).

Figure 5:
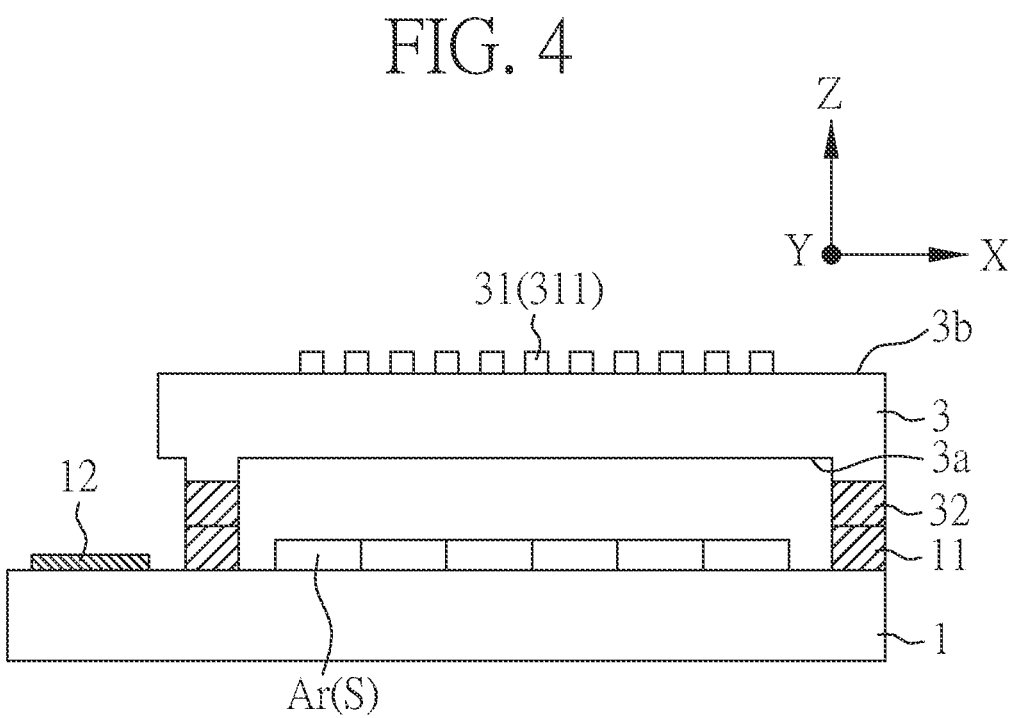
FIG. 5 is a schematic view of a sensing device according to one embodiment of the present disclosure.

FIG. 5 is a schematic view of a sensing device according to one embodiment of the present disclosure. The sensing device in FIG. 5 is similar to that shown in FIG. 3C, except for the following differences.

In one embodiment of the present disclosure, as shown in FIG. 5, the optical lens 31 of the sensing device is disposed on the second substrate 3. More specifically, the optical lens 31 of the sensing device is disposed on the second surface 3b of the second substrate 3. In addition, in other embodiments of the present disclosure, the sensing device shown in FIG. 5 may further comprise an optical film 4 as shown in FIG. 4, which is not described again here.

The detailed structure of the optical lens 31 of the present disclosure will be described in detail below.

Figure 6A:
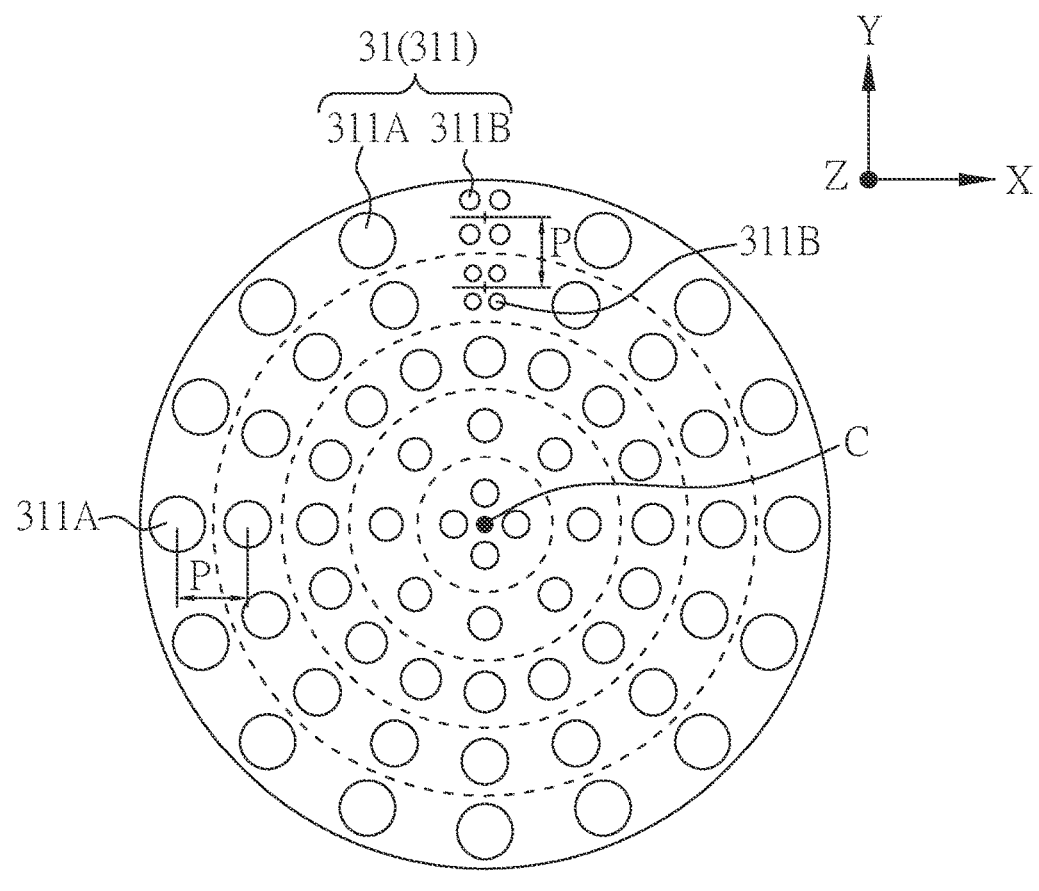
FIG. 6A is a schematic top view of an optical lens according to one embodiment of the present disclosure.
Figure 6B:
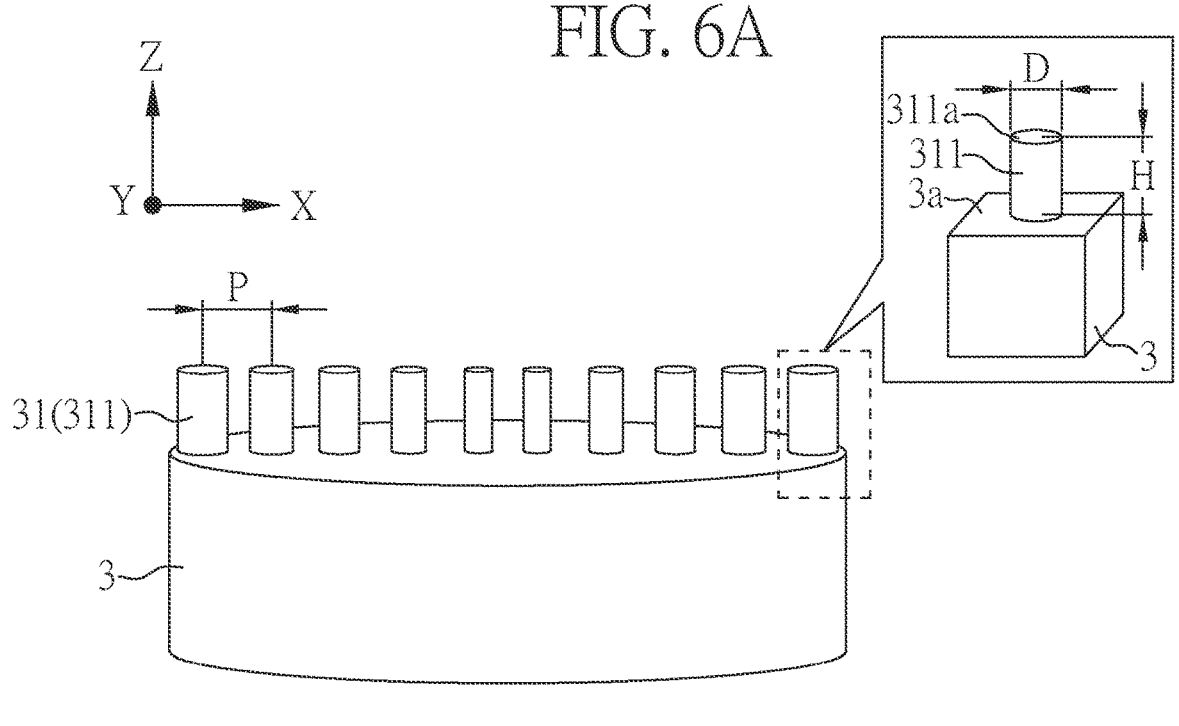
FIG. 6B is a side view of FIG. 6A.

FIG. 6A is a schematic top view of an optical lens according to one embodiment of the present disclosure. FIG. 6B is a side view of FIG. 6A. For convenience of explanation, some micro-structures are omitted in FIG. 6B.

In one embodiment of the present disclosure, the optical lens 31 may comprise a plurality of micro-structures 311. More specifically, as shown in FIG. 6A, the plurality of micro-structures 311 may be formed by a plurality of single micro-structures 311A, or the plurality of micro-structures 311 may be formed by a plurality of sub-micro-structures 311B. In one embodiment of the present disclosure, the pitch P between the micro-structures 311 may be greater than or equal to 1 μm and less than or equal to 20 μm. Herein, the pitch P of the micro-structures 311 may refer to the distance between the centers of two adjacent single micro-structures 311A, or may also refer to the distance between the geometric centers of adjacent groups of the plurality of sub-micro-structures 311B. In addition, in one embodiment of the present disclosure, as shown in FIG. 6A, the plurality of micro-structures 311 may be arranged in a concentric circle around the center C of the optical lens 31, but the present disclosure is not limited thereto.

In one embodiment of the present disclosure, as shown in FIG. 6B, one of the plurality of micro-structures 311 has a height H greater than or equal to 0.1 μm and less than or equal to 20 μm. The "height" refers to the distance between the top surface 311a of the micro-structure 311 and the surface of the second substrate 3 (the first surface 3a or the second surface 3b). In one embodiment of the present disclosure, as shown in FIG. 6B, one of the plurality of micro-structures 311 may be a cylinder, and a diameter D of the cylinder is less than the pitch P between the micro-structures 311. For example, the diameter D may be greater than or equal to 0.1 μm and less than 20 μm. In addition, as shown in FIG. 6A and FIG. 6B, the plurality of micro-structures 311 may have the same or different diameters D. For example, the diameters D of the plurality of micro-structures 311 may decrease from the outside to the center C of the optical lens 31, but the present disclosure is not limited thereto.

In the present embodiment, the micro-structures 311 in FIG. 6A and FIG. 6B are cylinders as examples. However, in other embodiments of the present disclosure, the micro-structures 311 may have different shapes. Other aspects will be described below.

Figure 7A:
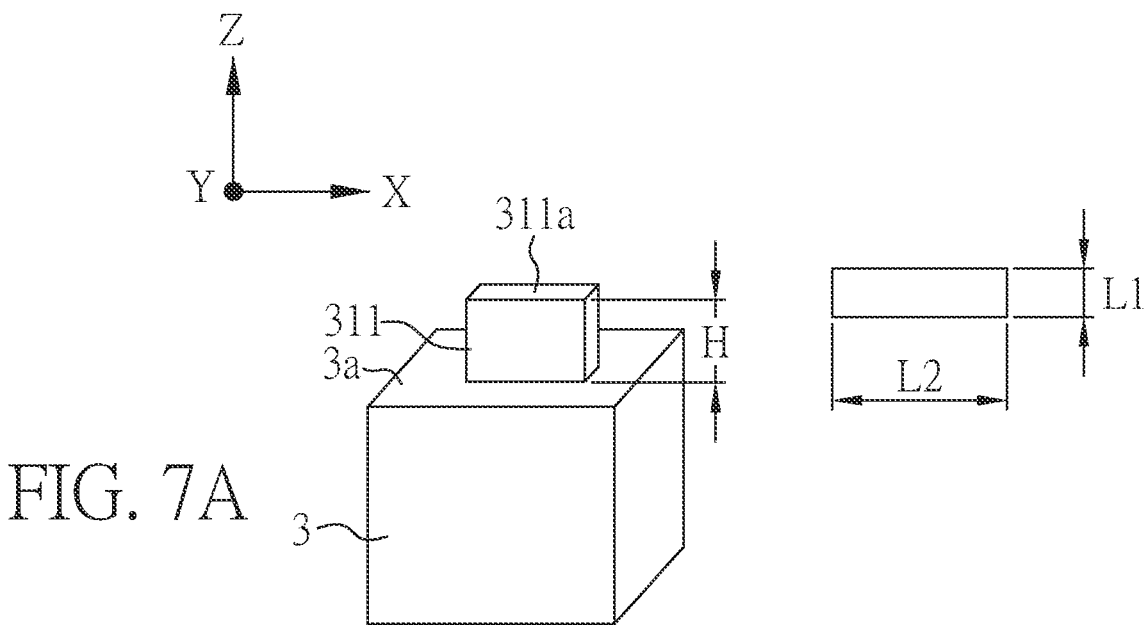
FIG. 7A and FIG. 7B are perspective views of part of an optical lens according to one embodiment of the present disclosure.
Figure 7B:
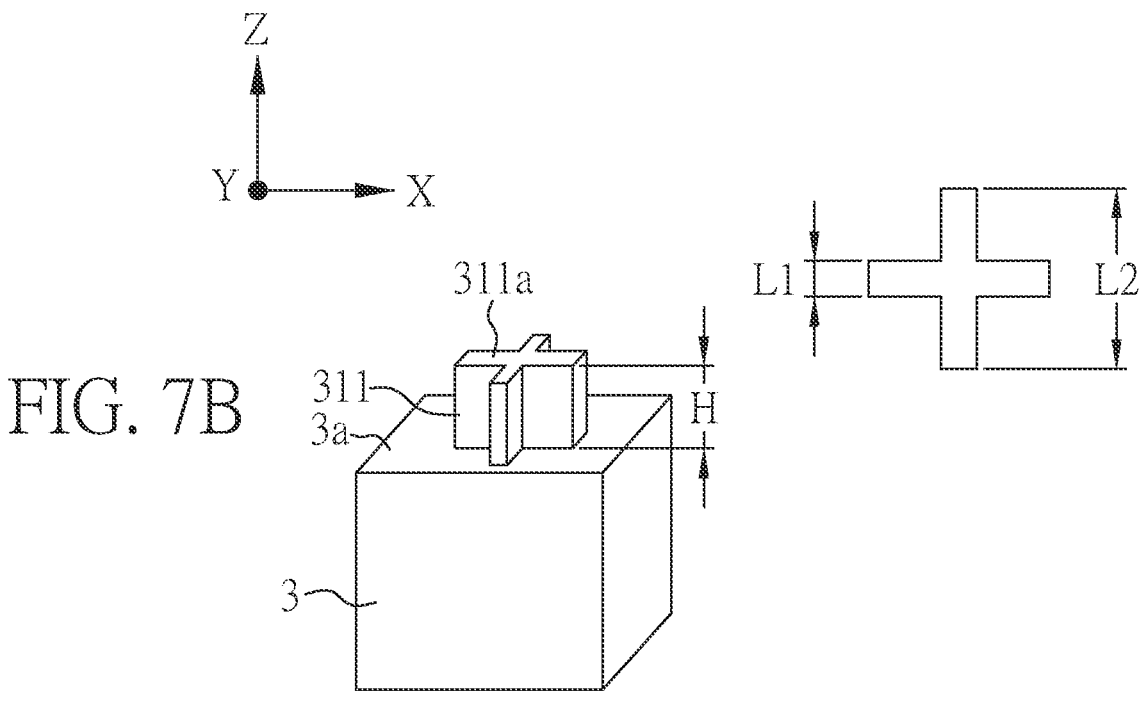

FIG. 7A and FIG. 7B are perspective views of part of an optical lens according to one embodiment of the present disclosure. The optical lenses of FIG. 7A and FIG. 7B are similar to that shown in FIG. 6B except for the differences in the micro-structures.

In one embodiment of the present disclosure, as shown in FIG. 7A, one of the plurality of micro-structures 311 may be a cuboid with a width L1 and a length L2, the width L1 is less than the length L2, and the length L2 is less than the pitch P between the plurality of micro-structures 311 (that is, L1<L2<P). For example, the width L1 and the length L2 may respectively be greater than or equal to 0.1 μm and less than 20 μm, where the width L1 is less than the length L2. In addition, one of the micro-structures 311 has a height H greater than or equal to 0.1 μm and less than or equal to 20 μm. The "height" refers to the distance between the top surface 311a of the micro-structure 311 and the surface of the second substrate 3 (the first surface 3a or the second surface 3b).

In one embodiment of the present disclosure, as shown in FIG. 7B, one of the plurality of micro-structures 311 may be a cross column with a width L1 and a length L2, the width L1 is less than the length L2, and the length L2 is less than the pitch P between the plurality of micro-structures 311 (that is, L1<L2<P). For example, the width L1 and the length L2 may respectively be greater than or equal to 0.1 μm and less than 20 μm, where the width L1 is less than the length L2. In addition, one of the micro-structures 311 has a height H greater than or equal to 0.1 μm and less than or equal to 20 μm. The "height" refers to the distance between the top surface 311a of the micro-structure 311 and the surface of the second substrate 3 (the first surface 3a or the second surface 3b).

The above specific examples are to be construed as illustrative only and not in any way limiting of the remainder of the present disclosure.

Although the present disclosure has been explained in relation to its embodiment, it is to be understood that many other possible modifications and variations can be made without departing from the spirit and scope of the disclosure as hereinafter claimed.

The invention claimed is:

1. A sensing device, comprising:
a first substrate;
a plurality of sensing units disposed on the first substrate, wherein the plurality of sensing units are used for sensing light with wavelengths within a wavelength range; and
a second substrate disposed opposite to the first substrate and assembled to the first substrate, wherein the second substrate has an overlapping area overlapping with the plurality of sensing units in a normal direction of the first substrate,
wherein the second substrate has an optical lens in the overlapping area, the optical lens comprises a plurality of micro-structures, and a pitch between the plurality of micro-structures is less than or equal to a maximum wavelength value of the wavelength range;
wherein a distance between the optical lens and the plurality of sensing units is between 150 μm and 250 μm in the normal direction of the first substrate.

2. The sensing device of claim 1, wherein the second substrate has a recess, and the optical lens is disposed in the recess.

3. The sensing device of claim 1, wherein the wavelength range is between 8 μm and 20 μm.

4. The sensing device of claim 1, wherein the pitch between the plurality of micro-structures is greater than or equal to 1 μm and less than or equal to 20 μm.

5. The sensing device of claim 1, wherein one of the plurality of micro-structures has a height greater than or equal to 0.1 μm and less than or equal to 20 μm.

6. The sensing device of claim 1, wherein one of the plurality of micro-structures is a cylinder, and a diameter of the cylinder is less than the pitch between the plurality of micro-structures.

7. The sensing device of claim 1, wherein one of the plurality of micro-structures is a cuboid with a width and a length, the width is less than the length, and the length is less than the pitch between the plurality of micro-structures.

8. The sensing device of claim 1, wherein one of the plurality of micro-structures is a cross column with a width and a length, the width is less than the length, and the length is less than the pitch between the plurality of micro-structures.

9. The sensing device of claim 1, wherein the second substrate comprises a first surface and a second surface opposite to the first surface, the first surface is closer to the first substrate than the second surface, and the optical lens is disposed on the first surface or the second surface.

10. The sensing device of claim 1, further comprising an optical film disposed on the second substrate.

11. The sensing device of claim 10, wherein a material of the optical film comprises zinc sulfide, zinc selenide, germanium, magnesium fluoride, beryllium fluoride, potassium chloride, arsenic trisulfide or a combination thereof.

12. The sensing device of claim 10, wherein the optical film is disposed on a side of the second substrate away from the optical lens.

13. The sensing device of claim 10, wherein the optical film is disposed on the optical lens.

14. The sensing device of claim 10, wherein a thickness of the optical film is between 0.01 μm and 5 μm.

15. The sensing device of claim 1, wherein a material of the second substrate comprises silicon, germanium, chalcogenide glass, gallium arsenide or a combination thereof.

16. The sensing device of claim 1, wherein a material of the optical lens comprises silicon, germanium, chalcogenide glass, gallium arsenide, zinc sulfide, zinc selenide or a combination thereof.

17. The sensing device of claim 1, further comprising: a plurality of first bonding units disposed on the first substrate, wherein the plurality of sensing units are disposed between the plurality of first bonding units; and a plurality of second bonding units disposed on the second substrate, wherein the optical lens is disposed between the plurality of second bonding units.

18. The sensing device of claim 17, wherein the first substrate and the second substrate are assembled through the plurality of first bonding units and the plurality of the second bonding units.

19. The sensing device of claim 1, further comprising a pad disposed on the first substrate, wherein the pad is disposed adjacent to a sensing array comprising the plurality of sensing units and is electrically connected to the sensing array.

* * * * *